US007999970B2

(12) United States Patent
Miyatake

(10) Patent No.: US 7,999,970 B2
(45) Date of Patent: Aug. 16, 2011

(54) LIGHT SOURCE DEVICE, OPTICAL SCANNING DEVICE, AND IMAGE FORMING APPARATUS

(75) Inventor: Naoki Miyatake, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 963 days.

(21) Appl. No.: 11/717,693

(22) Filed: Mar. 14, 2007

(65) Prior Publication Data

US 2007/0216754 A1 Sep. 20, 2007

(30) Foreign Application Priority Data

Mar. 15, 2006 (JP) ................................ 2006-070534

(51) Int. Cl.
*G06F 15/00* (2006.01)
*G02B 26/08* (2006.01)

(52) U.S. Cl. ..................................... 358/1.4; 359/204.1

(58) Field of Classification Search .................. 358/1.4, 358/475, 480, 1.16, 1.1, 474, 1.15, 1.13, 358/486, 296, 518, 300, 501; 347/242, 233, 347/238, 116, 241; 235/476, 479; 359/205.1, 359/204.1, 213.1, 221.2, 200.1
See application file for complete search history.

(56) References Cited

U.S. PATENT DOCUMENTS

| | | | |
|---|---|---|---|
| 6,621,512 B2 | 9/2003 | Nakajima et al. | |
| 6,813,051 B2 * | 11/2004 | Suzuki et al. | 359/201.1 |
| 6,987,593 B2 | 1/2006 | Hayashi et al. | |
| 7,050,082 B2 | 5/2006 | Suzuki et al. | |
| 7,050,210 B2 | 5/2006 | Atsuumi et al. | |
| 7,088,484 B2 | 8/2006 | Hayashi et al. | |
| 7,154,651 B2 | 12/2006 | Atsuumi et al. | |
| 7,161,724 B1 | 1/2007 | Miyatake | |
| 2003/0011830 A1 | 1/2003 | Miyatake | |
| 2004/0184127 A1 | 9/2004 | Nakajima et al. | |
| 2004/0240000 A1 | 12/2004 | Miyatake et al. | |
| 2005/0093962 A1 | 5/2005 | Miyatake et al. | |
| 2005/0094234 A1 | 5/2005 | Miyatake et al. | |
| 2005/0200910 A1 | 9/2005 | Kanoshima et al. | |
| 2006/0000990 A1 | 1/2006 | Hayashi et al. | |
| 2006/0203264 A1 | 9/2006 | Miyatake | |
| 2007/0002417 A1 | 1/2007 | Hirakawa et al. | |

FOREIGN PATENT DOCUMENTS

| | | |
|---|---|---|
| JP | 09-054263 | 2/1997 |
| JP | 10-073778 | 3/1998 |
| JP | 11-014932 A | 1/1999 |
| JP | 11-038348 A | 2/1999 |
| JP | 2001-010107 A | 1/2001 |
| JP | 2001-033720 A | 9/2001 |
| JP | 2003-5114 A | 1/2003 |
| JP | 2001-4948 A | 7/2003 |
| JP | 2004-070109 A | 3/2004 |
| JP | 2004-271906 A | 9/2004 |

* cited by examiner

*Primary Examiner* — Saeid Ebrahimi Dehkordy
(74) *Attorney, Agent, or Firm* — Harness, Dickey & Pierce, P.L.C.

(57) ABSTRACT

A light-source holding member that holds semiconductor lasers along the sub-scanning direction is fixed to an attachment member at two points with first and second screws. An elastic member is interposed between the light-source holding member and the attachment member to urge the second screw upwards. The light-source holding member can be tilted with respect to the sub-scanning direction depending on the fastening force of the second screw. By adjusting the fastening force of the second screw, angles of light beams emitted from the semiconductor lasers are adjustable.

17 Claims, 9 Drawing Sheets

LIGHT SOURCE DEVICE, OPTICAL SCANNING DEVICE, AND IMAGE FORMING APPARATUS

CROSS-REFERENCE TO RELATED APPLICATIONS

The present document incorporates by reference the entire contents of Japanese priority document, 2006-070534 filed in Japan on Mar. 15, 2006.

BACKGROUND OF THE INVENTION

1. Field of the Invention

The present invention relates to a light source device, an optical scanning device that includes the light source device, and an image forming apparatus that includes the optical scanning device.

2. Description of the Related Art

Optical scanning devices relating to laser printers or the like are widely known. Generally, in such an optical scanning device, a light beams emitted from a light source are deflected by a deflector. Through an optical scanning and imaging system such as an fθ lens, the light beams are directed to and focused on a surface to be scanned (hereinafter, "scanned surface"). Accordingly, a light spot is formed on the surface to scan the surface in the main-scanning direction. The surface is, for example, a photoconductive surface of a photoreceptor of an electronic imaging-forming apparatus.

An example of full-color image forming apparatuses includes four photoreceptors arranged along the direction in which a recording sheet is transferred, a plurality of light source devices that corresponds to the photoreceptors, and a plurality of optical scanning and imaging systems that corresponds to the photoreceptors. Light beams emitted from the light source devices are deflected by a deflector and then simultaneously scan scanned surfaces of the photoreceptors through the optical scanning and imaging systems. Accordingly, an electrostatic latent image is formed on each of the scanned surfaces. The electrostatic latent images are visualized by an image developer using developers of different colors such as yellow, magenta, cyan, and black. Thereafter, the resultant images are sequentially transferred onto a single recording sheet so that the images overlap, and then are stabilized. In this manner, a color image is obtained.

The imaging forming apparatus that includes at least two combinations of optical scanning devices and photoreceptors to obtain a two-color image, multi-color image or full-color image is known as tandem-type image forming apparatuses. The tandem-type image forming apparatus may include a single deflector that corresponds to all of a plurality of photoreceptors.

With respect to tandem-type image forming apparatuses each including a single deflector, for example, Japanese Patent No. 3295281 discloses an optical scanning device that includes a deflector and a plurality of optical scanning units that is arranged along the sub-scanning direction. The light beams substantially parallel and separated in the sub-scanning direction are incident on the deflector, and then, each of the light beams passes through a corresponding one of the optical scanning units to scan a corresponding one of scanned surfaces. Japanese Patent Application Laid-open Nos. 2001-4948, 2001-10107, and 2001-33720 disclose a technology in which a plurality of light beams directed toward different scanned surfaces is incident on one side of the deflector. After the light beams pass through lenses L1 and L2, each of the light beams passes through corresponding one of lenses L3.

When a single deflator that deflects a plurality of light beams is used instead of a plurality of deflectors, an image forming apparatus can be miniaturized.

The number of deflectors of an optical scanning device can be reduced in a full-color image forming apparatus that includes four scanned surfaces (photoreceptors) of different colors such as cyan, magenta, yellow, and black. However, the size of the deflector such as a polygon mirror increases in the sub-scanning direction because light beams directed to the photoreceptors are substantially parallel and separated in the sub-scanning direction when being incident on the deflector. In general, a polygon mirror costs high compared to other optical elements that constitute an optical scanning device. For such reasons, cost reduction and miniaturization of the optical scanning device are difficult.

For cost reduction, Japanese Patent Application Laid-open No. 2003-5114 discloses an optical scanning device of a color image forming apparatus having an oblique-incidence optical system that includes a single deflector. The deflector has a deflecting-reflecting surface on which each of a plurality of light beams is incident at an angle with respect to the sub-scanning direction.

In the oblique-incidence optical system, light beams are deflected and reflected on the deflecting-reflecting surface. Each of the light beams is directed to a corresponding one of the scanned surfaces through a corresponding one of deflecting mirrors. The angles, at which the light beams are incident on the deflecting-reflecting surface, allow the light beams to be separated by the deflecting mirrors.

The oblique-incidence optical system assures separation of adjacent light beams directed to the different scanned surfaces without an increase of the size of the deflector. In other words, an increase in the number of polygon mirrors and the thickness of the polygon mirror.

However, in the oblique-incidence optical system, large scanning line curvature may occur. The amount of the scanning line curvature varies depending on the angle of each light beam to the sub-scanning direction, at which the light beam is incident on the deflecting-reflecting surface. The curvature causes a difference in color of an image obtained by overlapping electrostatic latent images formed by the light beams and visualizing them using different color toners. The light beams are obliquely incident on a scanning lens, which increases wavefront aberration and deteriorates optical performance at a peripheral image height. Thus, a beam-spot diameter increases, which lowers image quality.

As a method of correcting the large scanning line curvature caused in the oblique-incidence optical system, for example, Japanese Patent Application Laid-open No. H11-14932 discloses an optical scanning and imaging system in which a lens-surface tilts in a sub-scanning direction is changed in a main-scanning direction to correct scanning line curvature. Japanese Patent Application Laid-Open No. H11-38348 discloses an optical scanning and imaging system in which a reflection-surface tilts in a sub-scanning direction is changed in a main-scanning direction to correct scanning line curvature.

Japanese Patent Application Laid-Open No. 2004-70109 discloses a technology in which a light beam obliquely incident on a deflector passes outside the axis of a scanning lens, and scanning lines are aligned with a surface by which the amount of asphericity of the non-generatrix of the scanning lens changes along the main-scanning direction. With the conventional technology, scanning line curvature can be corrected with a single scanning lens. However, Japanese Patent Application Laid-Open No. 2004-70109 does not refer to an increase in beam-spot diameter resulting from increase of wavefront aberration.

The skew rays of the oblique-incidence optical system tend to increase wavefront aberration, and thus, increase a beam-spot diameter near the ends of a scanning line. To perform scanning with beam spots in high density, the beam spots need to be prevented from being larger. While the conventional technologies are capable of correcting the scanning line curvature, the wavefront aberration is not sufficiently corrected.

As an optical scanning device for correcting both scanning line curvature and wavefront aberration, Japanese Patent No. 3450653 discloses an optical scanning device that includes an optical scanning and imaging system that includes a plurality of asymmetric-surface lenses. The shape of a generatrix that connects the vertices of non-generatrices on the lens surfaces of the rotating asymmetric lenses is curved in the sub-scanning direction.

However, because each of the lenses corresponds to each of light beams, an increased number of lenses are necessary when the optical scanning and imaging system is used for a tandem-type optical scanning device.

When a plurality of light beams directed to different scanned surfaces is incident on the same lens, scanning line curvature and wavefront aberration of one of the light beams can be prevented by curving the generatrix. However, it is difficult to reduce scanning line curvature and wavefront aberration caused by the other light beams.

Because of curvature of a lens in the sub-scanning direction, light beams incident on the lens may shift or tilt in the sub-scanning direction due to an error that occurs when the optical elements are processed or assembled. In such a case, the scanning line curvature is caused from refraction of the lens. Accordingly, prevention of color difference that is originally thought to be possible cannot be achieved.

It is also difficult to prevent wavefront aberration and obtain a preferred beam-spot diameter stably because the angles of the beams on the curved surface vary and thus the amount of skew of the light beams changes. Accordingly, the image quality deteriorates.

In addition, when the angles of incidence are changed as described, the light beams may not precisely pass through or be deflected by other optical elements such as scanning lenses or deflecting mirrors. Consequently, the beam-spot diameter is changed, and further, the light beams are prevented from reaching the scanned surfaces.

The above-described inconveniences are solved by accurately processing and assembling the optical elements. However, the accurate processing and assembly increase the cost of the optical elements and assembly time.

When the angles of incidence of the light beams on the deflecting-reflecting surface are increased in the oblique-incidence optical system, various types of aberrations are increased, which deteriorates optical performance. Specifically, the beam-spot diameter changes and the scanning line curvature increases. For this reason, it is preferable that the angles of incidence be smaller.

However, smaller angles of incidence make it difficult to cause each of light beams to be directed to a corresponding one of scanned surfaces. The light beams are separated with the minimum intervals at a separation point such that the light beams are directed to and incident on different deflecting-reflecting surfaces at smaller angles. However, when the angles of incidence are changed, some of the light beams may not precisely pass through or be deflected by the optical elements, and the beam-spot diameter increases. Even when the light beams precisely pass through or are deflected by the optical elements, the beam-spot diameter changes, and preferred beam spots cannot be obtained.

Japanese Patent Application Laid-open No. 2004-271906 discloses a light source device of,an oblique-incidence optical system. However, the light source device cannot prevent the change in angles of incidence due to the processing error or assembly error. Coupling lens can be adjusted in the sub-scanning direction after all optical elements are assembled. However, in this case, attachment or adjustment of the light source device is complicated, and the time required for adjustment increases.

SUMMARY OF THE INVENTION

It is an object of the present invention to at least partially solve the problems in the conventional technology.

According to an aspect of the present invention, a light source device includes a plurality of light sources, each light source configured to emit a light beam, a plurality of lenses, each lens corresponding to each of the light sources, and a holding member that integrally holds the light sources and the lenses such that adjacent light sources are separated in a sub-scanning direction and adjacent light lenses are separated in the sub-scanning direction. The light beams emitted from the light sources are not parallel. The holding member holds the light sources and the lenses such that a positional relationship between each of the light sources and a corresponding one of the lenses is adjustable.

According to another aspect of the present invention, an image forming apparatus includes an image carrier that carries an image on a surface thereof, and an optical scanning device that includes a light source device. The light source device includes a plurality of light sources configured to emit light beams, a plurality of lenses corresponding to the light sources, and a holding member that integrally holds the light sources and the lenses such that adjacent light sources are separated in a sub-scanning direction and adjacent light lenses are separated in the sub-scanning direction. The light beams emitted from the light sources are not parallel, and scan the surface of the image carrier to form an image on the surface. The holding member holds the light sources and the lenses such that a positional relationship between each of the light sources and a corresponding one of the lenses is adjustable.

According to still another aspect of the present invention, an image forming apparatus includes an image carrier that carries an image on a surface thereof, and an optical scanning device including a plurality of light source devices that are separated in a sub-scanning direction, a deflector that includes a deflecting-reflecting surface for deflecting light beams emitted from the light source devices, and an optical scanning system that causes the light beams deflected by the deflecting-reflecting surface to be focused on different surfaces to be scanned. Each of the light source devices includes a plurality of light sources, each light source configured to emit a light beam, a plurality of lenses, each lens corresponding to each of the light sources, and a holding member that integrally holds the light sources and the lenses such that adjacent light sources are separated in a sub-scanning direction and adjacent light lenses are separated in the sub-scanning direction. The light beams emitted from the light sources are not parallel, and scan the surface of the image carrier to form an image on the surface. The holding member holds the light sources and the lenses such that a positional relationship between each of the light sources and a corresponding one of the lenses is adjustable.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings.

Figure 1:
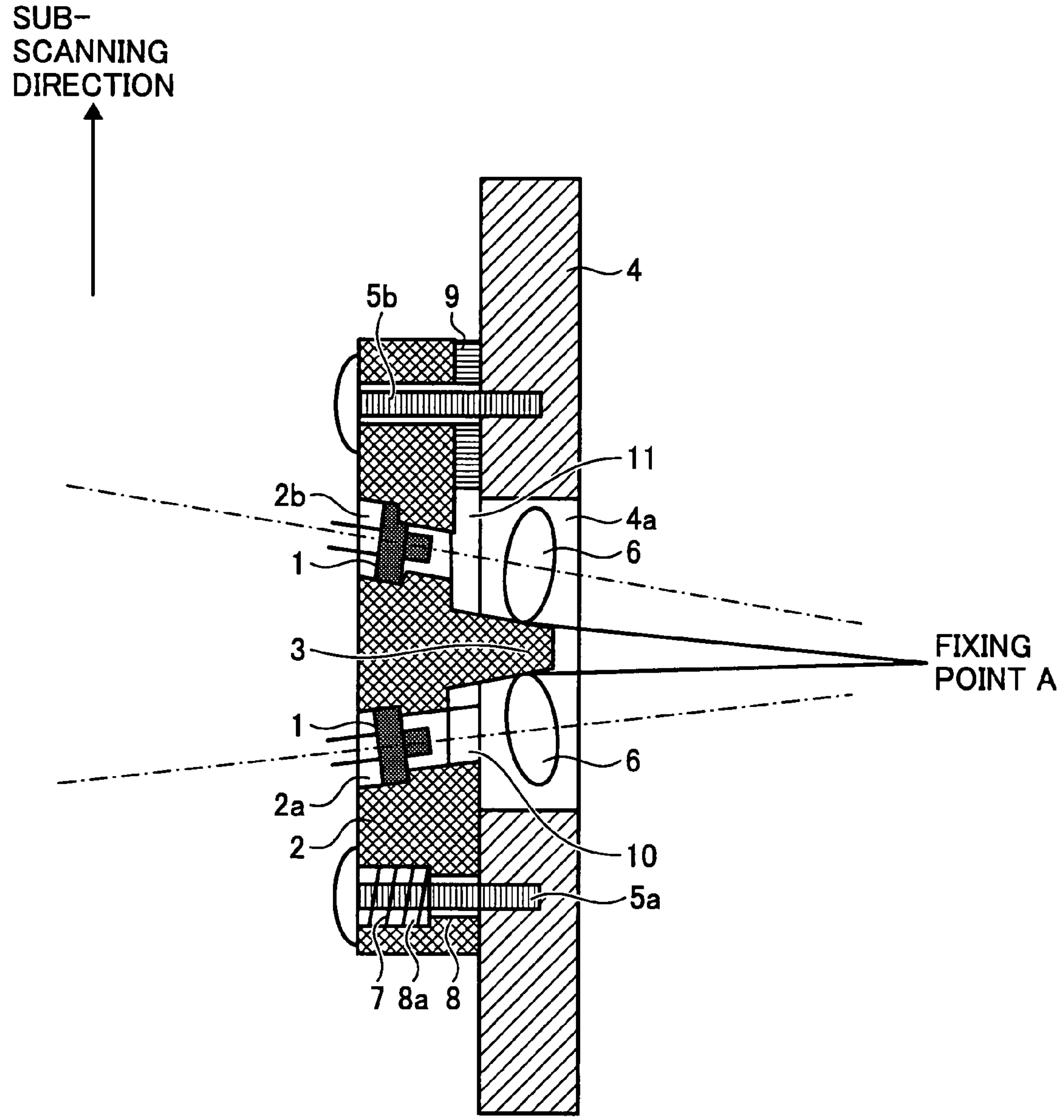
FIG. 1 is a cross section of a light source device according to an embodiment of the present invention.

FIG. 1 is a cross section of a light source device according to an embodiment of the present invention. The light source device includes semiconductor lasers 1, a light-source holding member 2, a lens fixing member 3, a platy attachment member 4, a first screw 5*a* and a second screw 5*b*, and coupling lenses 6. The light-source holding member 2 is made of aluminum die-cast, and includes through holes 2*a* and 2*b* to hold the semiconductor lasers 1 arranged in parallel to a sub-scanning direction. The lens fixing member 3 is integrally formed with the light-source holding member 2. The attachment member 4 includes a hole 4*a*. The first screw 5*a* and the second screw 5*b* are separated in the sub-scanning direction, and fix the light-source holding member 2 to the attachment member 4. The coupling lenses 6 are arranged in the hole 4*a*, and fixed to the lens fixing member 3 to face the corresponding semiconductor lasers 1.

The light source device further includes a spring 7, a screw insertion hole 8, and a platy elastic member 9. The spring 7 is arranged in a wide portion 8*a* of the screw insertion hole 8, and is wound around the first screw 5*a* to urge the first screw 5*a* upward. The elastic member 9 is interposed between the attachment member 4 and the light-source holding member 2 fixed to the attachment member 4 with the second screw 5*b*. A step 10 is formed on the side of the light-source holding member 2 in a portion between the light-source holding member 2 and the attachment member 4. In the embodiment, a space 11 is formed in a portion where the elastic member 9 is interposed between the light-source holding member 2 and the attachment member 4. The step 10 can be provided on the side of the attachment member 4.

Each of the coupling lenses 6 faces a corresponding one of the semiconductor lasers 1 such that divergent light beams are emitted from the semiconductor lasers 1 in predetermined directions as desired luminous fluxes. Each of the coupling lenses 6 is fixed to the lens fixing member 3 by filling the lens fixing member 3 with ultraviolet (UV) curable adhesive in the hole 4*a*. Although each of the coupling lenses 6 is fixed to the lens fixing member 3 at one fixing point A in this embodiment, each of the coupling lenses 6 can be fixed at a plurality of points, for example, three points. The through holes 2*a* for holding the semiconductor lasers 1 are arranged at an angle, and separated in the sub-scanning direction.

The light-source holding member 2 is fixed to the attachment member 4 with the first screw 5*a* and the second screw 5*b* at two points along the sub-scanning direction. The second screw 5*b* is urged upwards because of the presence of the elastic member 9. Depending on the fastening force of the second screw 5*b*, the light-source holding member 2 can tilt in the sub-scanning direction. In this manner, the angles of the light beams emitted from the light source device in the sub-scanning direction are adjustable.

Even when the light-source holding member 2 tilts by adjustment, the light-source holding member 2 can be fixed to and held by the attachment member 4 via the spring 7 because the first screw 5*a* is urged upwards by the spring 7.

It suffices that the first screw 5*a* side without the elastic member 9 allows the light-source holding member 2 to tilt in the sub-scanning direction. For example, a portion of the light-source holding member 2 can have a smaller thickness and be flexible.

Figure 2:
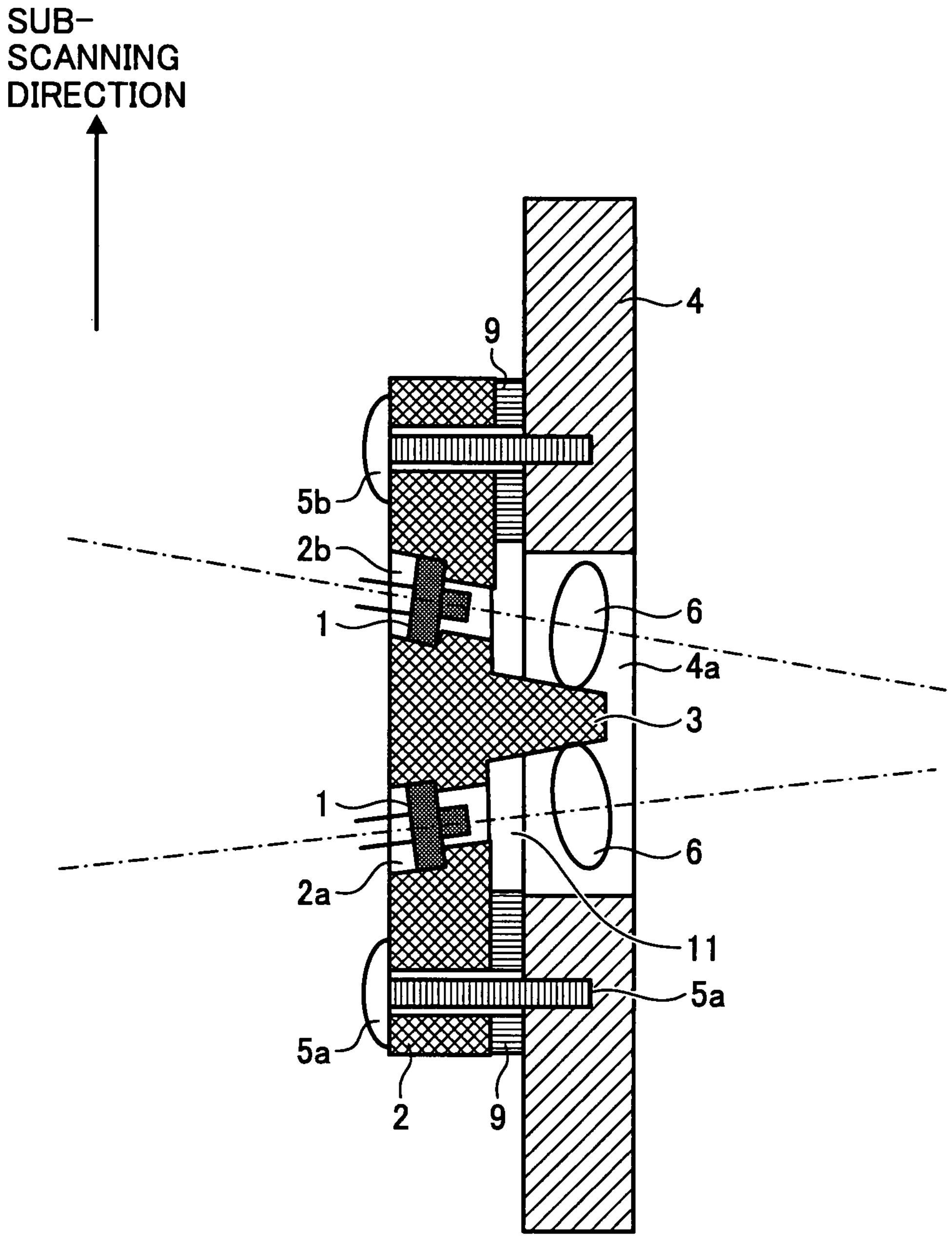
FIG. 2 is a cross section of a modification of the light source device.

FIG. 2 is a cross section of a modification of the light source device. The modified light source device includes a couple of the elastic members 9. The elastic members 9 are interposed between the light-source holding member 2 and the attachment member 4 at portions where the light-source holding member 2 is attached to the attachment member 4 with the first screw 5*a*. and the second screw 5*b*.

The effects of the mechanism for adjusting the angle of the light-source holding member 2 in the sub-scanning direction are described below.

In general, all optical element of the optical scanning device are hardly processed and assembled in an ideal state. For example, upon installation of the light source device, when a deflecting mirror in front of a deflector such as a polygon mirror tilts in the sub-scanning direction, angles of light beams from the light source device, which have already been adjusted, change in the sub-scanning direction.

As described, in an oblique-incidence optical system, oblique-incidence angle is preferably set to be small to prevent deterioration in wavefront aberration and scanning line curvature, and miniaturize the optical scanning device. The light beams are separated with the minimum intervals at a separation point such that the light beams are directed to different scanned surfaces.

For this reason, when the angles of the light beams in the sub-scanning direction change, the light beams may not be deflected precisely by deflecting mirrors, which direct the light beams to different scanned surfaces. The imprecise deflecting increases the sizes of beam spots and prevents achieving stable optical performance and image quality. The optical performance may be lowered as well when the light beams pass through a scanning lens at points largely different from predetermined points.

Such optical elements, for example, a deflecting mirror can be larger along the sub-scanning direction so as to correspond to changes in the angles of the light beams in the sub-scanning direction. However, the larger mirror results in increased cost of the mirror and increased size of the optical scanning device, and optical performance may deteriorate due to an increase in the oblique-incidence angle.

The above inconveniences can be solved easily in the light source device according to the embodiment because the angles of the light beams in the sub-scanning direction are adjustable by the fastening force of the screw. In other words, even when angles of the light beams change in the sub-scanning direction due to an error that occurs in assembly of optical elements, the light source device can be adjusted in a direction to offset the change. In this manner, stable optical performance can be realized without high assembling accuracy.

As described, a change in angles of incidence on the scanning lens causes deterioration in the wavefront aberration, and thus, a stable diameter of beam spots cannot be obtained. The change also causes scanning line curvature and color shift in an image in a tandem-type image forming apparatus described below, which lowers image quality.

The change in angles of incidence in the oblique-incidence optical system is larger than that in an optical system in which parallel light beams are incident on a deflecting-reflecting surface of a deflector. However, in the light source device according to the embodiment, the angles of the light beams in the sub-scanning direction can be adjusted easily, and hence, deterioration in the wavefront aberration and the increase of the scanning line curvature are prevented.

With the light source device according to the embodiment that includes the light-source holding member 2 holding the semiconductor lasers 1 as shown in FIGS. 1 and 2, upon adjustment of angles in the sub-scanning direction, both angles of light beams emitted from the semiconductor lasers 1 change in the sub-scanning direction. However, when the light-source holding member 2 holds the semiconductor lasers 1 each emitting a light beam and the coupling lenses 6 such that the light beams are emitted in desired directions, the angles of the light beams change simultaneously in the sub-scanning direction on common optical elements such as the deflecting mirror and the optical deflector. In this manner, both the light beams are adjusted preferably.

The angle adjustment is easier with the light source device shown in FIG. 2 that includes elastic members 9 in the two portions. The angles are adjustable by adjusting the fastening force of the first screw 5*a* and the second screw 5*b*, and the angles can be adjusted both smaller and larger.

As the elastic member 9, any elastic material such as a spring or rubber can be used as long as the desired effect is obtained.

Figure 3:
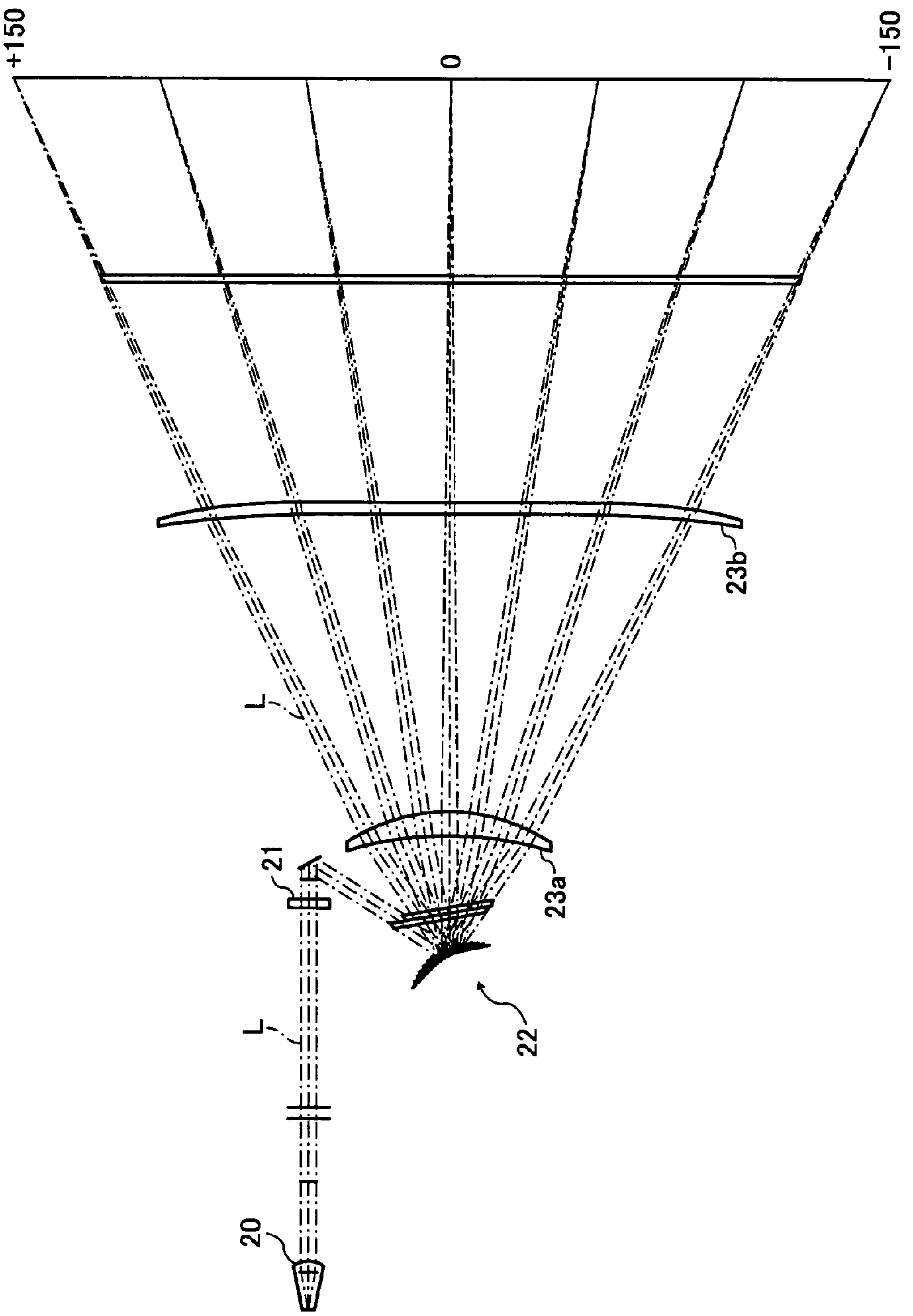
FIG. 3 is a plan view of a simplex optical scanning device that includes the light source device.
Figure 4:
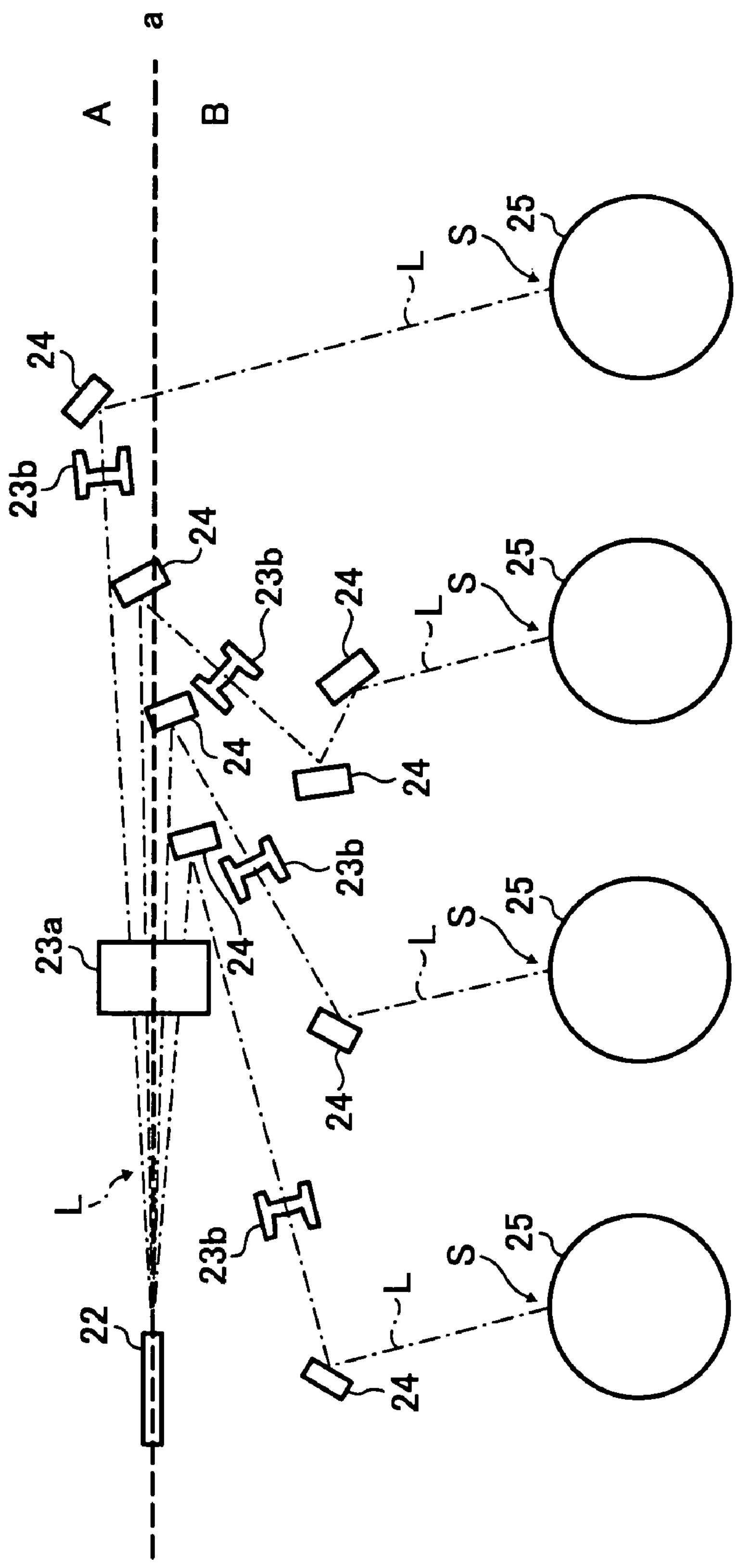
FIG. 4 is a front view of the optical scanning device shown. 3.

FIG. 3 is a plan view of a simplex optical scanning device that includes the light source device. FIG. 4 is a front view of the optical scanning device. As shown in FIG. 3, semiconductor lasers that serve as light sources emit divergent light beams L. A bundle of the light beams L is converted by coupling lenses 20 to be suitable for the optical system to which the light beams L enter after passing through the coupling lenses 20. Through the conversion, the light beams L can be parallel or can have small divergence or weak convergence. By a cylindrical lens 21, the light beams L from the coupling lenses 20 converge along the sub-scanning direction, and then are incident on the deflecting-reflecting surface of a polygon mirror 22 serving as a deflector.

As shown in FIG. 4, the light beams L are incident on the deflecting surface while being tilted against a plane a that is perpendicular to the rotation axis of the polygon mirror 22. Thus, the light beams L reflected on the deflecting-reflecting surface are tilted with respect to the plane a. Each of the light beams L is deflected at a constant angular velocity correspondingly to the constant rotation of the polygon mirror 22. After passing through an optical scanning system that includes a common first scanning lens 23*a* and a second scanning lenses 23*b* and deflecting mirrors 24, the light beams L are focused on a scanned surface of a corresponding one of photoreceptors 25, thus forming a beam spot S on the surface so that the surface is scanned.

The characteristics of the oblique-incidence optical systems are described with reference to FIG. 4 depicting the simplex optical scanning device of a tandem-type color image forming apparatus. Only one side of the optical scanning device is used for optical scanning.

Light beams L emitted from a plurality of light source devices (not shown) is obliquely incident on a deflecting-reflecting surface of the polygon mirror 22. The light beams L are incident on the deflecting-reflecting surface on both sides (regions A and B shown in FIG. 4) of the normal of the deflecting-reflection surface. After the light beams L pass through the first scanning lens 23*a*, each of the light beams L is directed and incident on a corresponding one of the scanned surfaces of the photoreceptors 25 through the deflecting mirrors 24. In the embodiment, a couple of the first scanning lens 23*a* and the second scanning lens 23*b* is used, and the first scanning lens 23*a* and the second scanning lens 23*b* are arranged with respect to each of the light beams L traveling towards a corresponding one of the scanned surfaces.

Figure 5A:
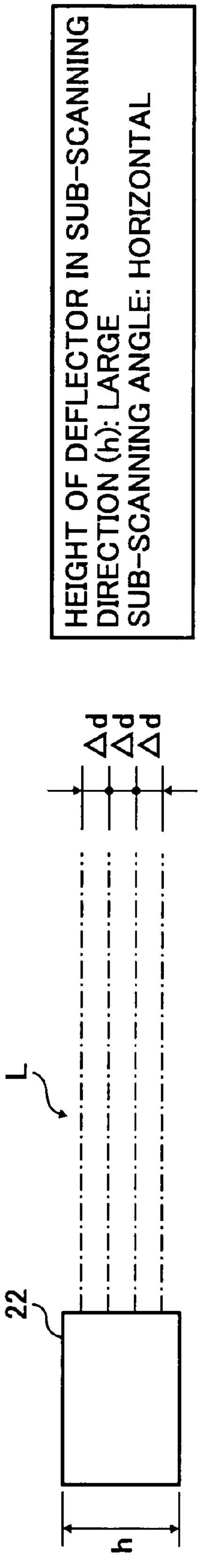
FIGS. 5A and 5B are side views of a conventional optical scanning device and the optical scanning device shown in FIG. 3 for explaining the relationship between light beams and a polygon mirror thereof.
Figure 5B:
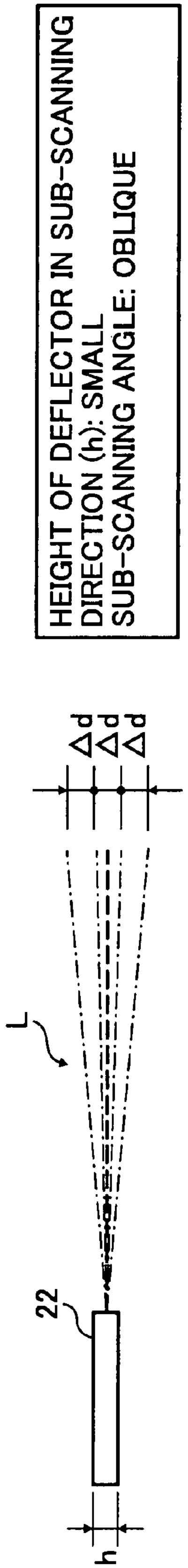

With a conventional simplex optical scanning device in which all light beams are parallel to the normal of the deflecting-reflecting surface, excellent optical performance can be realized easily. However, as shown in FIG. 5A, the light beams L, i.e., light beams led to different scanned surfaces, need to be separated with an interval (Δd in FIG. 5A) generally of 3 mm to 5 mm necessary for separation. The interval increases the height h of the polygon mirror 22, and thus the area exposed to the atmosphere increases. Accordingly, power consumption due to windage loss, costs, and noises are increased. Particularly, the polygon mirror is expensive among the constituents of the optical scanning device, and the cost problem is significant.

In the optical scanning device according to the embodiment, because the light beams L are incident on the polygon mirror 22 at an angle (in the sub-scanning direction) with respect to the normal of a deflecting-reflecting surface of the polygon mirror 22. Accordingly, the polygon mirror 22 has a smaller height h. Thus, it is possible to obtain the polygon mirror 22 of a single polyhedron forming the deflation-reflecting surfaces having a smaller thickness in the sub-scanning direction. Hence, the inertia of the polygon mirror 22 can be reduced and the start time can be shortened.

According to the embodiment, the light beams L intersect in the sub-scanning direction near the deflecting-reflecting surface of the polygon mirror 22. Therefore, the adjacent light beams L are reflected on the deflecting-reflecting surface at spots close to each other in the sub-scanning direction. For this reason, the polygon mirror 22 can have the minimum height.

Figure 6A:
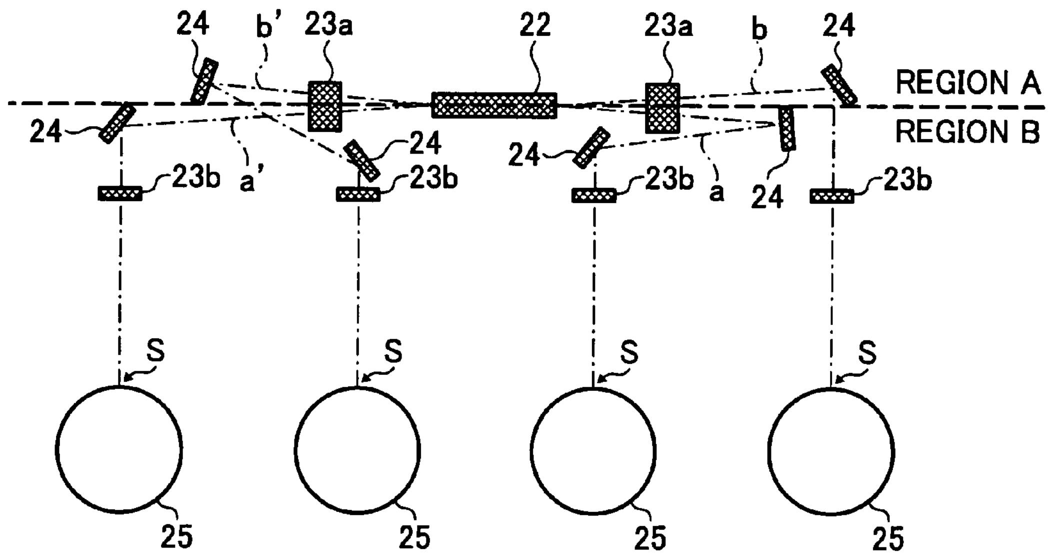
FIG. 6A is a front view of a duplex optical scanning device that includes the light source device.

The smaller height can be realized also in a duplex optical scanning device shown in FIG. 6A, in which both sides of the polygon mirror 22 are used for optical scanning.

Figure 6B:
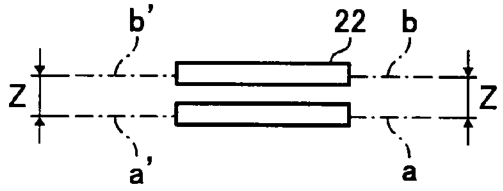
FIGS. 6B and 6C are side views of another duplex optical scanning device and the optical scanning device shown in FIG. 6A for explaining the relationship between light beams and a polygon mirror thereof.
Figure 6C:
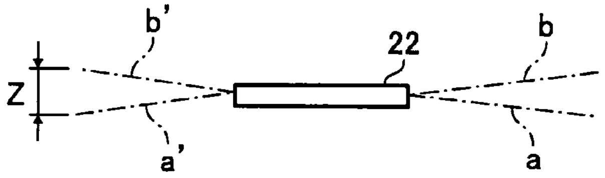

In the optical-scanning device shown in FIG. 6A, light beams a and b are incident at an angle on one side of a deflecting-reflecting surface, and light beams a' and b' are incident at an angle on the other opposite side of the deflecting-reflecting surface as shown in FIG. 6C. The light beams a, b, a' and b' can be parallel as shown in FIG. 6B. In FIGS. 6A to 6C, the same reference numerals are given to parts that correspond to those described above, and the same description is not repeated.

The optical elements in front of the defector of the simplex optical scanning system are described.

In the simplex optical scanning system, as shown in FIG. 4, at least four light beams L, each directed to a corresponding one of the photoreceptors 25, need to be incident on the same deflecting-reflecting surface at different angles in the sub-scanning direction. After the light beams L pass through the scanning lens 23*a* and 23*b*, each of the light beams L is directed to and focused on a corresponding one of the photoreceptors 25.

For the light beams L, at least four light sources are necessary. If the light sources are arranged with a spacing in the sub-scanning direction, the semiconductor lasers 1 or the coupling lenses 20 interfere in the sub-scanning direction. Accordingly, the incidence angles increase, and thus it is difficult to miniaturize the optical scanning device and realize the stable optical performance.

For this reason, it is preferable in the embodiment that light source devices 28 and 29, each including two light sources arranged with a spacing in the sub-scanning direction as described in connection with FIGS. 1 and 2, be arranged with a spacing in the main-scanning direction.

Figure 7A:
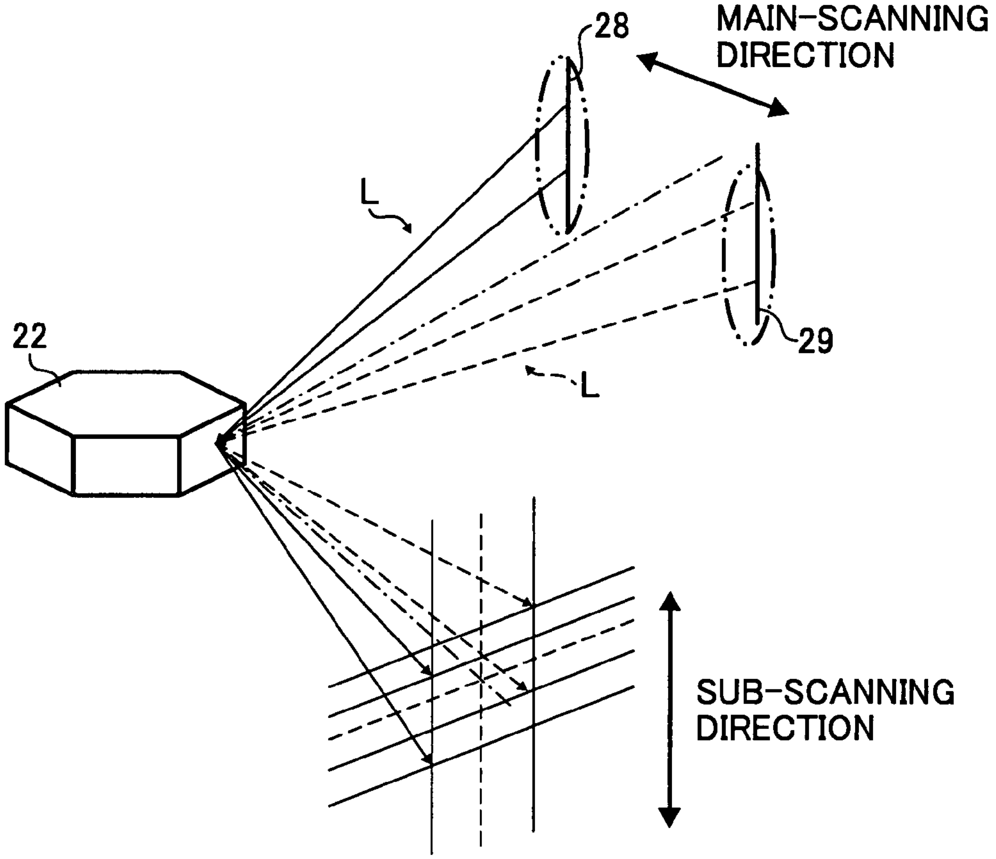
FIGS. 7A and 7B are schematics for explaining an example of a combination of light sources of the light source device.
Figure 7B:
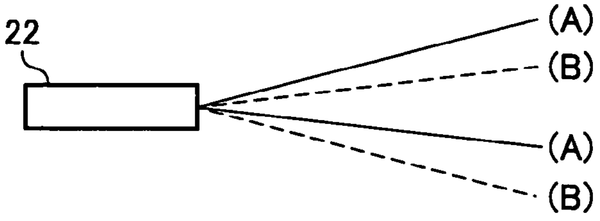

The light beams are emitted from the light sources preferably at combinations of angles (A) and (B) shown in FIGS. 7A and 7B. This assures larger intervals between the light sources without increasing the incidence angle of the outermost light beam L in the sub-scanning direction. In other words, the light sources of the single light source device preferably have different angles in the sub-scanning direction so that the light beams emitted from the light sources have different oblique-incidence angles.

It is further preferable that all the light beams L intersect near the deflecting-reflecting surface.

Figure 8A:
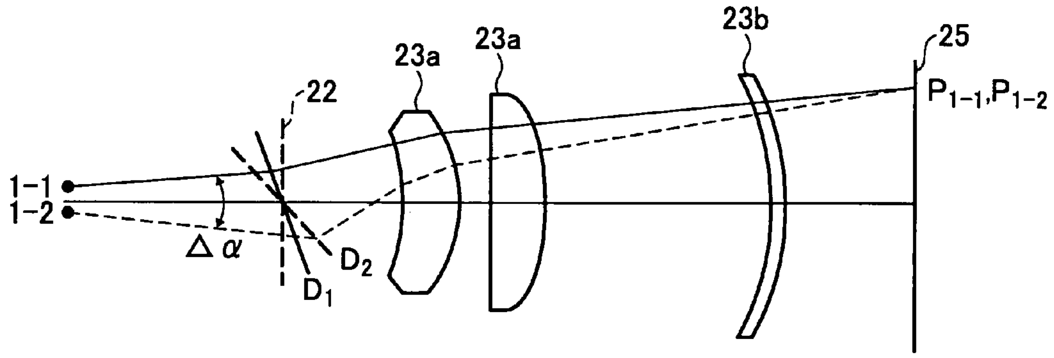
FIGS. 8A and 8B are schematics of light beams that intersect near a deflecting-reflecting surface of a polygon mirror.
Figure 8B:
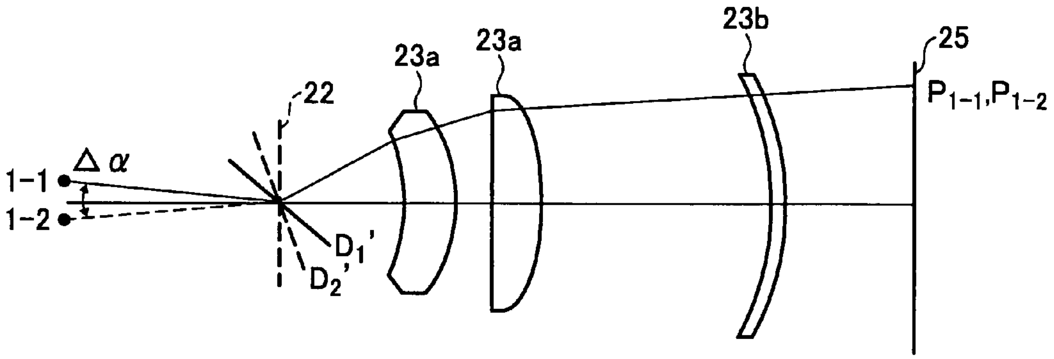

The intersection of the light beams is described below with reference to FIGS. 8A and 8B. In FIGS. 8A and 8B, each of reference numerals D1, D2, D1', and D2' indicates a position of the deflecting-reflecting surface of the polygon mirror 22, and each of reference numerals 23*a* and 23*b* denotes a scanning lens.

Specifically, each of reference numerals D1 and D1' indicates a position of the deflecting-reflecting surface where a light beam L emitted from a semiconductor laser 1-1 reaches a point $P_{1-1}$ on the scanned surface of the corresponding photoreceptor 25, the point $P_{1-1}$ corresponding to a certain image height. Each of reference numerals D2 and D2' indicates a position of the deflecting-reflecting surface where a light beam L emitted from a semiconductor laser 1-2 reaches a point $P_{1-2}$ on the scanned surface of the corresponding photoreceptor 25, the point $P_{1-2}$ corresponding to the image height.

The light beams L are incident on the polygon mirror 22 while being separated by $\Delta\alpha°$ as shown in FIGS. 8A and 8B. Therefore, between the light beam L reflected on the deflecting-reflecting surfaces at positions D1 and D1' as well as between those reflected at positions D2 and D2', a delay occurs in reaching the image height by the difference in angles.

The light beams L shown in FIG. 8A are directed along different light paths. Meanwhile, the light beams L in FIG. 8B are directed along the same light path. The light beams L that are directed along the different light paths are influenced by different optical effects, and accordingly, the light beams L that reaches the same image height, i.e., points $P_{1-1}$ and $P_{1-2}$, on the photoreceptor 25 result in different optical characteristics such as aberration.

Meanwhile, the light beams L that intersect near the deflecting-reflecting surface are directed along substantially the same light path, and accordingly, all the light beams L have similar optical characteristics. Even when the optical elements, on which the light beams L are incident after being incident on the polygon mirror 22, are not positioned appropriately and thus the writing positions of the light beams L changes in the main scanning direction, the amounts of the change are almost the same. Accordingly, it is possible to prevent offset in the writing positions of the light beams L in the main scanning direction.

As shown in FIG. 4, each of the light beams L from the respective light sources is directed to a corresponding one of the photoreceptors 25. The light beams L can be emitted from a single light source device by applying the light source device according to the embodiment to an oblique-incidence optical system. This leads to the miniaturization of the light source device and the optical system through which the light beams L passes before being incident on the polygon mirror 22.

The optical scanning device according to the embodiment can include, as a light source, a multi-beam light source device that emits a plurality of light beams which simultaneously scans corresponding scanned surfaces. Examples of the multi-beam light source device include a semiconductor laser array having a plurality of light emitting points, and a multi-beam light source device that includes multiple light sources, each having a single light emitting point or a plurality of light emitting points. With the multi-beam light source device, a high-speed and high-density optical-scanning device and an image forming apparatus can be realized.

Figure 9:
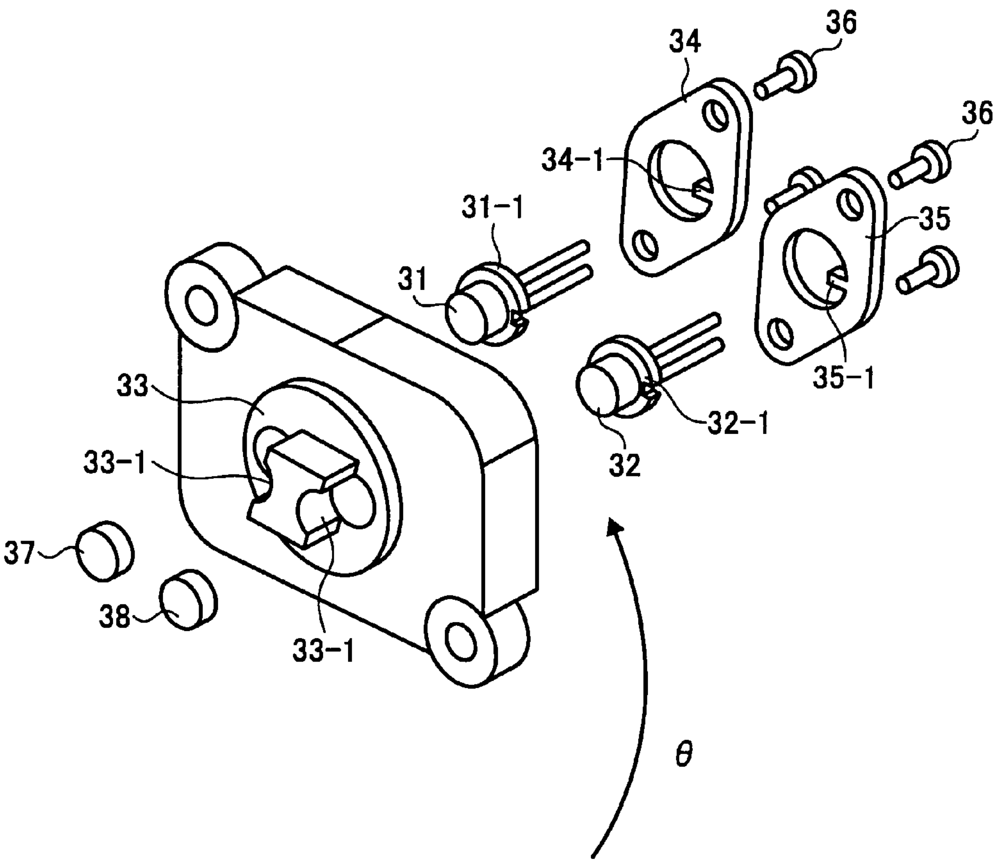
FIG. 9 is an exploded perspective view of the light source device.

FIG. 9 is an exploded perspective view of the multi-beam light source device.

As shown in FIG. 9, semiconductor lasers 31 and 32 are fitted to fitting holes (not shown) on the back of a base member 33. Each of the fitting holes slightly tilts by a predetermined angle, about 1.5° in the embodiment, in the main-scanning direction, and thus the semiconductor lasers 31 and 32 also tilts by 1.5° in the main-scanning direction. The semiconductor lasers 31 and 32 include heat sinks 31-1 and 32-1, each having a cutout. Pressing members 34 and 35 include juts 34-1 and 35-1 formed on the periphery of center holes thereof. Each of the juts 34-1 and 35-1 is engaged with each of the cutouts to adjust the directions of the light sources. The pressing members 34 and 35 are fixed to the back of the base member 33 with screws 36, and accordingly, the semiconductor lasers 31 and 32 are fixed to the base member 33.

The base member 33 includes a pair of semicircular attachment-guiding surfaces 33-1. Collimating lenses 37 and 38 are attached with their circumferential surfaces along the attachment-guiding surfaces 33-1, respectively, to adjust the direction, in which light beams are directed, such that divergent light beams that are emitted from light emitting points are parallel.

By arranging a plurality of the base members 33 to be held by the light-source holding member 2 shown in FIGS. 1 and 2 along the sub-scanning direction as light sources, a multi-beam light source device can be realized that includes a plurality of light emitting points. The semiconductor lasers 31 and 32 can be arranged at an angle with respect to the sub-scanning direction, and the base members 33 can be held by the light-source holding member 2 at an angle with respect to the sub-scanning direction.

The base member 33 can have the mechanism of the light-source holding member 2 so that angles of both the base member 33 and the light-source holding member 2 in the sub-scanning direction can be adjusted.

The semiconductor laser used in the embodiment can be an array of semiconductor lasers, each having a light emitting point, or a single semiconductor laser that emits a plurality of light beams.

Figure 10:
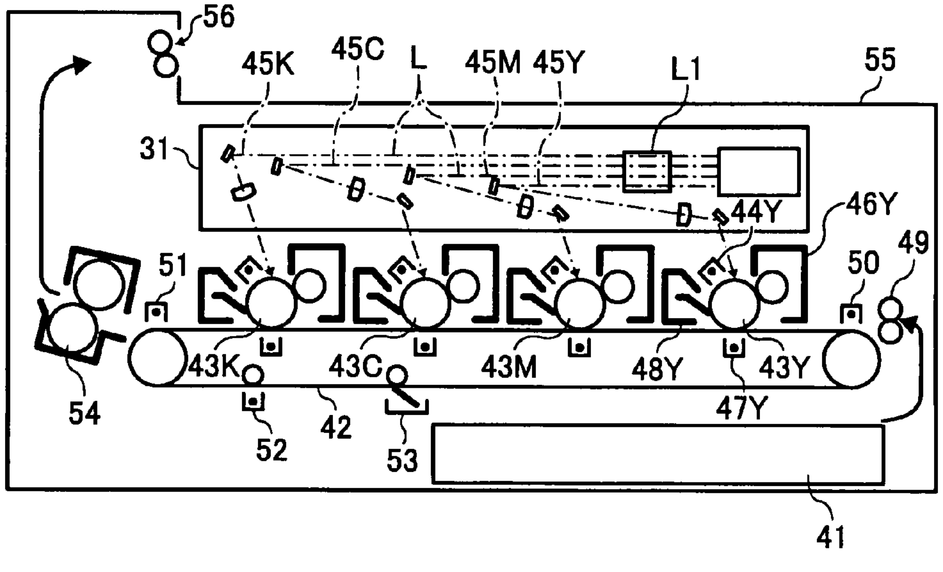
FIG. 10 is a schematic side view of an image forming apparatus that includes the optical scanning device.

An image forming apparatus that includes the optical scanning device according to the embodiment is described with reference to FIG. 10. In the following description, the optical scanning device is applied to a tandem-full-color laser printer as the image forming apparatus.

The image forming apparatus includes a sheet cassette 41 that are horizontally arranged at a lower part of the image forming apparatus, and a transfer belt 42. A transfer sheet (not shown) that is fed from the sheet cassette 41 is transferred by the transfer belt 42. Above the transfer belt 42, photoreceptors 43Y for yellow, 43M for magenta, 43C for cyan, and 43K for black are arranged at equal intervals in this order from the upstream side in the direction in which the transfer sheet is transferred. The photoreceptors 43Y, 43M, 43C and 43K have the same diameter. Around the photoreceptors 43Y, 43M, 43C and 43K, processing units for electrographic process are arranged in order. For example, around the photoreceptor 43Y, a charger 44Y, an optical scanning system 45Y, a developing device 46Y, a transfer charger 47Y and a cleaning unit 48Y are arranged in order. Similarly, such processing units are arranged on each of the photoreceptors 43M, 43C and 43K.

In the embodiment, the surfaces of the photoreceptors 43Y, 43M, 43C and 43K are scanned or radiated for respective colors, and optical scanning systems 45Y, 45M, 45C and 45K are arranged in one-to-one correspondence with the photoreceptors 43Y, 43M, 43C and 43K. Note that a scanning lens L1 is commonly used in the optical scanning systems 45Y, 45M, 45C and 45K.

Around the transfer belt 42, resist rollers 49 and a belt charger 50 are arranged in the upstream of the photoreceptor 43Y in the rotation direction of the transfer belt 42. In the downstream of the photoreceptor 43K, a belt separation charger 51, a discharging charger 52 and a cleaning unit 53 are arranged in order. A fixing unit 54 is arranged in the downstream of the belt separation charger 51. A sheet-discharging roller 56 is arranged to discharge a transfer sheet that has an image fixed thereon to a tray 55.

In the image forming apparatus, full-color mode printing (a plurality of colors is used) is performed in the following manner. Light beams L are emitted from the optical scanning devices 45Y, 45M, 45C and 45K according to image signals corresponding to colors of yellow, magenta, cyan and black. Each of the light beams L scans a corresponding one of the surfaces of the photoreceptors 43Y, 43M, 43C and 43K, and thus, latent images are formed on the surfaces. The latent images are then developed by developing units, such as the developing device 46Y, to form toner images with color toners. Thereafter, the toner images are sequentially transferred to a transfer sheet that is transferred on the transfer belt 42 by transfer chargers, such as the transfer charger 47Y, and the like. Accordingly, the toner images overlap and a full-color image is formed on the transfer sheet. The full-color image is fixed by the fixing unit 54 and is then discharged to the tray 55 by the sheet-discharging roller 56.

When the optical scanning systems 45Y, 45M, 45C and 45K has the configuration of the oblique-incidence optical system according to the embodiment that is advantageous for cost reduction, low power consumption and the miniaturization of the optical scanning device, changes in the angles of light beams in the sub-scanning direction resulting from the influence of assembly error or processing error can be reduced. Thus, the scanning line curvature and deterioration in wavefront aberration can be reduced as well. Accordingly, the image forming apparatus can achieve excellent and stable image quality.

Incidentally, a duplex scanning device has the same configuration as previously descried for the simplex scanning device in the embodiment.

As set forth hereinabove, according to an embodiment of the present invention, the angles of light beams in a sub-scanning direction are adjustable by simply tilting a light-source holding member with respect to the sub-scanning direction. Thus, stable optical performance can be realized.

Moreover, changes in the angles of the light beams can be reduced, which suppresses the scanning line curvature and deterioration in wavefront aberration. Thus, an optical scanning device can be miniaturized while excellent and stable optical performance is achieved.

Furthermore, an image forming apparatus with low power consumption can be realized at low cost, which achieves excellent and stable image quality.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
- a plurality of light sources, each light source configured to emit a light beam;
- a plurality of lenses, each lens corresponding to each of the light sources;
- a holding member that integrally holds the light sources and the lenses such that adjacent light sources are separated in a sub-scanning direction and adjacent light lenses are separated in the sub-scanning direction; and
- an adjusting member that adjusts a tilt of the holding member with respect to the sub-scanning direction.

2. The light source device according to claim 1, further comprising:
- an attachment member to which the holding member is attached via the adjusting member; and
- an elastic member that is interposed between the holding member and the attachment member.

3. The light source device according to claim 2, wherein the holding member and the attachment member are arranged to form a gap that allows the holding member to tilt with respect to the sub-scanning direction.

4. The light source device according to claim 1, wherein the holding member holds the light sources and the lenses such that the light beams intersect near a deflecting-reflecting surface of a deflector and then are incident on the deflecting-reflecting surface.

5. The light source device according to claim 1, wherein the holding member holds the light sources and the lenses such that the light beams are emitted from the light sources at different angles with respect to the sub-scanning direction.

6. The light source device according to claim 1, wherein the light sources are a multi-beam light source that includes a plurality of light emitting points.

7. An optical scanning device comprising:

the light source device according to claim 1; and an optical scanning system that causes the light beams emitted from the light source devices to scan a surface to be scanned.

8. The optical scanning device according to claim 7, wherein the scanning optical unit causes each of the light beams to be incident on a corresponding one of the surfaces to be scanned.

9. An optical scanning device comprising:

a plurality of the light source devices according to claim 1, the light source devices being separated in the main-scanning direction;

a deflector that includes a deflecting-reflecting surface for deflecting the light beams emitted from the light source devices; and an optical scanning system that causes the light beams deflected by the deflecting-reflecting surface to be focused on different surfaces to be scanned.

10. The optical scanning device according to claim 9, wherein the light beams intersect in the sub-scanning direction near the deflecting-reflecting surface.

11. The optical scanning device according to claim 9, wherein the scanning optical unit causes each of the light beams to be incident on a corresponding one of the surfaces to be scanned.

12. The light source device according to claim 1, wherein the light beams emitted from the light sources are not parallel.

13. The light source device according to claim 1, wherein the adjusting member is attached to the holding member in at least two portions that are apart from each other with respect to the sub-scanning direction.

14. An image forming apparatus comprising:

an image carrier that carries an image on a surface thereof; and an optical scanning device that includes a light source device including a plurality of light sources configured to emit light beams;

a plurality of lenses corresponding to the light sources;

a holding member that integrally holds the light sources and the lenses such that adjacent light sources are separated in a sub-scanning direction and adjacent light lenses are separated in the sub-scanning direction; and an adjusting member that adjusts a tilt of the holding member with respect to the sub-scanning direction, wherein the light beams emitted from the light sources scan the surface of the image carrier to form an image on the surface.

15. The image forming apparatus according to claim 14, wherein the light beams emitted from the light sources are not parallel.

16. An image forming apparatus comprising:

an image carrier that carries an image on a surface thereof; and an optical scanning device that includes a plurality of light source devices that are separated in a sub-scanning direction;

a deflector that includes a deflecting-reflecting surface for deflecting light beams emitted from the light source devices; and an optical scanning system that causes the light beams deflected by the deflecting-reflecting surface to be focused on different surfaces to be scanned, wherein each of the light source devices includes a plurality of light sources, each light source configured to emit a light beam;

a plurality of lenses, each lens corresponding to each of the light sources;

a holding member that integrally holds the light sources and the lenses such that adjacent light sources are separated in a sub-scanning direction and adjacent light lenses are separated in the sub-scanning direction; and an adjusting member that adjusts a tilt of the holding member with respect to the sub-scanning direction, wherein the light beams emitted from the light sources scan the surface of the image carrier to form an image on the surface.

17. The image forming apparatus according to claim 16, wherein the light beams emitted from the light sources are not parallel.

* * * * *